US012172910B2

(12) United States Patent
Glatz et al.

(10) Patent No.: US 12,172,910 B2
(45) Date of Patent: Dec. 24, 2024

(54) IN-SITU ACID NEUTRALIZATION AND CARBON MINERALIZATION

(71) Applicant: Ebb Carbon, Inc., San Carlos, CA (US)

(72) Inventors: Guenther Glatz, Menlo Park, CA (US); Jeremy Loretz, Burlingame, CA (US); Matthew Eisaman, Port Jefferson, NY (US); Todd Pelman, Moss Beach, CA (US)

(73) Assignee: Ebb Carbon, Inc., San Carlos, CA (US)

( * ) Notice: Subject to any disclaimer, the term of this patent is extended or adjusted under 35 U.S.C. 154(b) by 0 days.

(21) Appl. No.: 18/620,884

(22) Filed: Mar. 28, 2024

(65) Prior Publication Data

US 2024/0327253 A1 Oct. 3, 2024

Related U.S. Application Data

(60) Provisional application No. 63/455,474, filed on Mar. 29, 2023.

(51) Int. Cl.
  *C02F 1/461* (2023.01)
  *C02F 1/469* (2023.01)
  (Continued)

(52) U.S. Cl.
  CPC .......... *C02F 1/4618* (2013.01); *C02F 1/4693* (2013.01); *C02F 2001/4619* (2013.01);
  (Continued)

(58) Field of Classification Search
  None
  See application file for complete search history.

(56) References Cited

U.S. PATENT DOCUMENTS

| 4,747,958 A | 5/1988 | Eberhardt |
| 5,089,120 A | 2/1992 | Eberhardt |

(Continued)

FOREIGN PATENT DOCUMENTS

| CN | 117326582 | 1/2024 |
| CN | 117446925 | 1/2024 |

(Continued)

OTHER PUBLICATIONS

Smith, Pete et al., Review Article entitled "Biophysical and economic limits to negative C02 emissions", published online Dec. 7, 2015, 9 pages.

(Continued)

*Primary Examiner* — Richard C Gurtowski
(74) *Attorney, Agent, or Firm* — Bever, Hoffman & Harms, LLP

(57) ABSTRACT

An acid substance (e.g., HCl) generated as the byproduct of an ocean alkalinity enhancement (OAE) process is neutralized using an in-situ acid neutralization subsystem by forcing the acid byproduct through an alkaline formation such that the acid substance is neutralized through interaction with alkaline rocks as the acid byproduct flows from an injection well to a recovery well. A flow rate of acid substance through rock formation is optimized to (a) maximize the amount of neutralized acid substance, and (b) minimize the amount of residual acid substance at the recovery well. The acid flow rate is adjusted by mixing the acid byproduct with a buffer and/or by a flow control device. Acid neutralization and $CO_2$ capture are combined by forcing $CO_2$ through the alkaline formation to react with divalent ions generated by the acid neutralization process, thereby mineralizing the $CO_2$ in the form of carbonate rocks (e.g., limestone or dolostone).

7 Claims, 4 Drawing Sheets

(51) Int. Cl.
  *C02F 101/12* (2006.01)
  *C02F 103/08* (2006.01)

(52) U.S. Cl.
  CPC ...... *C02F 2101/12* (2013.01); *C02F 2103/08* (2013.01); *C02F 2201/4618* (2013.01); *C02F 2203/006* (2013.01); *C02F 2209/003* (2013.01); *C02F 2209/07* (2013.01); *C02F 2209/29* (2013.01); *C02F 2209/40* (2013.01)

(56) References Cited

U.S. PATENT DOCUMENTS

| | | |
|---|---|---|
| 9,937,471 B1 | 4/2018 | Eisaman |
| 11,629,067 B1 | 4/2023 | Pelman et al. |
| 2008/0221283 A1 | 9/2008 | Adams |
| 2011/0135551 A1 | 6/2011 | House et al. |
| 2012/0152359 A1 | 6/2012 | Burnett et al. |
| 2013/0008792 A1 | 1/2013 | Eisaman et al. |
| 2013/0180400 A1 | 7/2013 | Iwamoto et al. |
| 2013/0259743 A1* | 10/2013 | Keasler ............ C02F 3/342 424/94.4 |
| 2013/0336722 A1 | 12/2013 | Wright et al. |
| 2015/0235545 A1 | 8/2015 | Schoenheit et al. |
| 2016/0362800 A1 | 12/2016 | Ren et al. |
| 2017/0341952 A1 | 11/2017 | Eisman |
| 2019/0255495 A1 | 8/2019 | Shapira |
| 2023/0080924 A1 | 3/2023 | Thyagarajan et al. |
| 2023/0130444 A1 | 4/2023 | Sheldon-Coulson et al. |
| 2023/0139033 A1 | 5/2023 | Schlueter |
| 2023/0191322 A1 | 6/2023 | Shors |
| 2023/0212031 A1 | 7/2023 | Pelman |
| 2023/0357058 A1 | 11/2023 | Hu |
| 2023/0390704 A1 | 12/2023 | Eisaman |
| 2024/0182340 A1 | 6/2024 | Atwater |

FOREIGN PATENT DOCUMENTS

| | | |
|---|---|---|
| DE | 20306503 U1 | 7/2003 |
| KR | 20080082597 A | 9/2008 |
| WO | 2022030529 A1 | 2/2022 |

OTHER PUBLICATIONS

House, Kurt Zenz et al., article entitled "Electrochemical Acceleration of Chemical Weathering as an Energetically Feasible Approach to Mitigating Anthropogenic Climate Change", Environ. Sci. Technol. 2007, 41, 8464-8470 (7 pages).

Digdaya, Ibadillah A., et al. article entitled "A direct coupled electrochemical system for caputure and conversion of CO2 from oceanwater", Nature Communications, 2020 (Year: 2020), 36 pages.

Katsuyoshi, Tatennuma et al., article entitled "The challenge of Global CO2 reduction: The potential of the method based on seawater electrolysis" published in Advances in Environmental Studies, vol. 6, Issue 1, pp. 452-454, Mar. 4, 2022 (Year: 2022).

Oshlies, et al., publication entitled "Guide to Best Practices in Ocean Alkalinity Enhancement Research", Copernicus Publications published 2023 (Year: 2023), 242 pages.

* cited by examiner

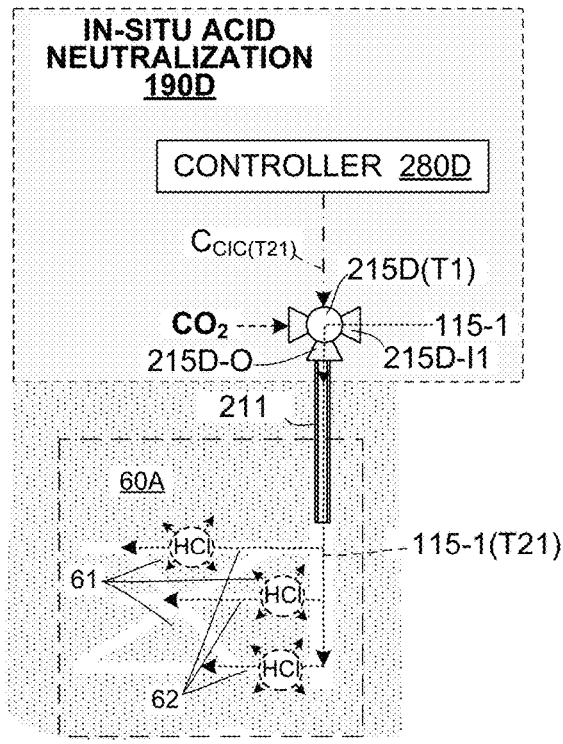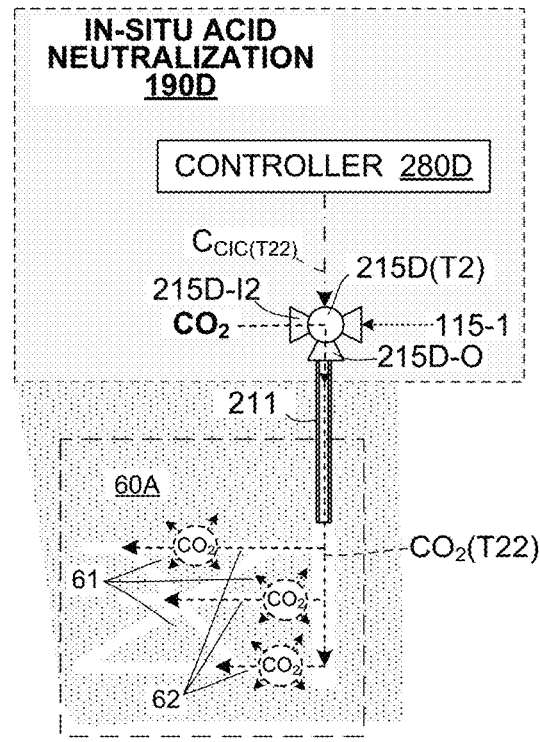
FIG. 4A
FIG. 4B
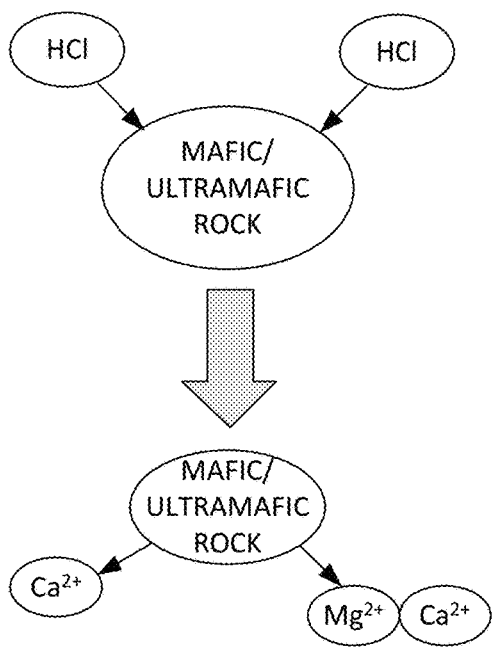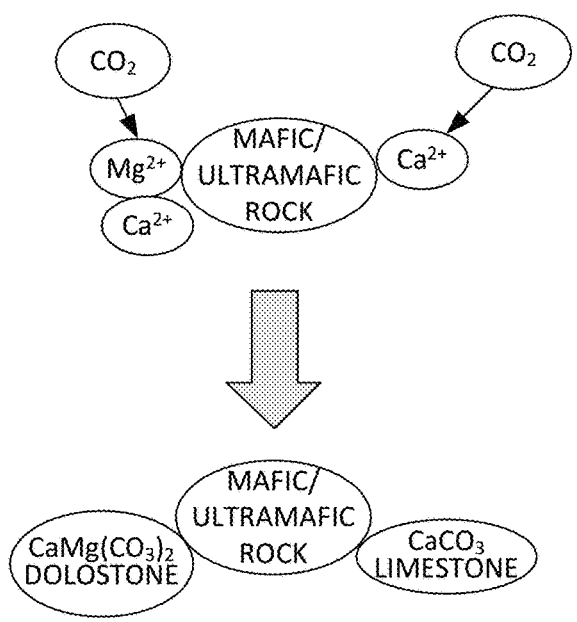
FIG. 5A
FIG. 5B

IN-SITU ACID NEUTRALIZATION AND CARBON MINERALIZATION

RELATED APPLICATIONS/PATENTS

This application claims priority from U.S. Provisional Patent Application No. 63/455,474, entitled "OAE SYSTEM WITH CONTROLLED ACID NEUTRALIZATION", which was filed on Mar. 29, 2023.

FIELD OF THE INVENTION

The systems and methods described herein generally relate to in-situ acid neutralization and in-situ carbon mineralization.

BACKGROUND OF THE INVENTION

As humans burn more and more fossil fuels, the resulting increased carbon dioxide ($CO_2$) concentration in Earth's atmosphere causes both climate change and ocean acidification. The increased atmospheric concentrations of $CO_2$ and other greenhouse gasses (e.g., methane) produces climate change by trapping heat close to earth's surface, thereby increasing both air and sea temperatures. Because earth's oceans absorb about 25% of atmospheric $CO_2$, and because the absorbed $CO_2$ dissolves to form carbon acid that remains trapped in the seawater, the increased atmospheric $CO_2$ concentration caused by burning fossil fuels also produces ocean acidification by way of increasing the amount of $CO_2$ gas dissolved in the ocean.

Both climate change and ocean acidification pose significant threats to humans. Climate change in the form of increased global average temperatures can produce several dangerous effects such as the loss of polar ice and corresponding increased sea levels, disease, wildfires and stronger storms and hurricanes. Ocean acidification changes the ocean chemistry that most marine organisms rely on. One concern with ocean acidification is that the decreased seawater pH can lead to the decreased survival of shellfish and other aquatic life having calcium carbonate shells, as well as some other physiological challenges for marine organisms.

To avoid dangerous climate change, the international Paris Agreement aims to limit the increase in global average temperature to no more than 1.5° C. to 2° C. above the temperatures of the pre-industrial era. Global average temperatures have already increased by between 0.8° C. and 1.2° C. The Intergovernmental Panel on Climate Change (IPCC) estimates that a 'carbon budget' of about 500 $GtCO_2$ (billion tons of carbon dioxide), which corresponds to about ten years at current emission rates, provides a 66% chance of limiting climate change to 1.5° C.

In addition to cutting $CO_2$ emissions by curtailing the use of fossil fuels, climate models predict that a significant deployment of Negative Emissions Technologies (NETs) will be needed to avoid catastrophic ocean acidification and global warming beyond 1.5° C. (see "Biophysical and economic limits to negative $CO_2$ emissions", Smith P. et al., Nat. Clim. Chang. 2016; 6: 42-50). Current atmospheric $CO_2$ and other greenhouse gas concentrations are already at dangerous levels, so even a drastic reduction in greenhouse gas emissions would merely curtail further increases, not reduce atmospheric greenhouse gas concentrations to safe levels. Moreover, the reduction or elimination of certain greenhouse gas sources (e.g., emissions from long distance airliners) would be extremely disruptive and/or expensive and are therefore unlikely to occur soon.

Therefore, there is a need to supplement emission reductions with the deployment of NETs, which are systems/processes that serve to reduce existing atmospheric greenhouse gas concentrations by, for example, capturing/removing $CO_2$ from the air and sequestering it for at least 1,000 years. The need for NETs may be explained using a bathtub analogy in which atmospheric $CO_2$ is represented by water contained in a bathtub, ongoing $CO_2$ emissions are represented by water flowing into the tub, and NETs are represented by processes that control water outflow through the tub's drain. In this analogy, reduced $CO_2$ emission rates are represented by partially turning off the water inflow tap—the slower inflow rate provides more time before the tub fills, but the tub's water level will continue to rise and eventually overflow. Using this analogy, although reducing $CO_2$ emissions may slow the increase of greenhouse gas in the atmosphere, critical concentration levels will eventually be reached unless NETs are implemented that can offset the reduced $CO_2$ emission level (i.e., remove atmospheric $CO_2$ at the same rate it is being emitted). Moreover, because greenhouse gas concentrations are already at dangerous levels (i.e., the tub is already dangerously full), there is an urgent need for NETs that are capable of significantly reducing atmospheric $CO_2$ faster than it is being emitted to achieve safe atmospheric concentration levels (i.e., outflow from the tub's drain must be greater than the reduced inflow from the tap to reduce the tub's water to a safe level).

NETs can be broadly characterized as Direct Air Capture (DAC) approaches and Ocean Capture approaches. DAC approaches utilize natural (e.g., reforestation) and technology-based methods to extract $CO_2$ directly from the atmosphere. Ocean capture approaches utilize various natural and/or technological processes to remove $CO_2$ from the atmosphere and store it in the ocean as bicarbonate, a form of carbon storage that is stable for over 10,000 years.

Electrochemical ocean alkalinity enhancement (OAE) represents an especially promising ocean capture approach that both reduces atmospheric $CO_2$ and mitigates ocean acidification by generating an ocean alkalinity product (i.e., an aqueous alkaline solution containing a fully dissolved base substance) and supplying the ocean alkalinity product to ocean seawater at a designated outfall location. A typical land based OAE system utilizes an ion exchange (IE) stack to perform an electrochemical (salt-conversion) process during which salt (sodium chloride (NaCl)) supplied in an aqueous salt feedstock solution (e.g., seawater or brine) is converted into the desired base substance (sodium hydroxide (NaOH) and an acid substance (hydrochloric acid (HCl). Note that the base substance leaving the IE stack is fully dissolved in an aqueous base solution. The OAE system then processes the aqueous base solution to generate the ocean alkalinity product (e.g., by diluting the aqueous base solution with seawater until the base substance concentration is at a level that does not endanger ocean sealife). When the ocean alkalinity product is subsequently supplied to an ocean, the base substance diffuses (disperses) into the surrounding seawater to serve two purposes: first, to directly reverse ocean acidification (i.e., by increasing the ocean seawater's alkalinity); and second, to indirectly reduce atmospheric $CO_2$ (i.e., increasing the ocean seawater's alkalinity increases the ocean's ability to absorb/capture atmospheric $CO_2$). Note that, because the base substance is fully dissolved in the ocean alkalinity product, the electrochemical OAE approach avoids problems associated with other OAE approaches (e.g., dissolution kinetics issues that are associated with conventional mineral OAE approaches).

As mentioned above, in addition to the desired NaOH base substance, OAE systems generate a significant amount of acid substance (typically HCl, but can be another seawater anion acid) as a byproduct of the electrochemical salt-conversion process (i.e., a typical land based OAE system produces on the order of 100 m³ of HCl per day, and potentially much more). Note that most of the NaOH base substance is typically supplied directly to the ocean to perform the useful purpose of decreasing ocean acidification and capture atmospheric $CO_2$, and that any retained base substance can be easily and safely stored in on-site storage containers (i.e., NaOH is relatively non-volatile). In contrast, the HCl (or other acid substance) generated by an OAE system's BPED may be both hazardous and serves no direct purpose in the OAE process, and therefore poses a significant on-site storage problem.

There are two possible ways to deal with the acid substance generated by an OAE system: moving/transporting the acid substance from the OAE system site to a designated location (e.g., a suitable storage/processing facility), or neutralizing the acid substance on-site. Transporting large amounts of HCl requires specialized storage containers and transportation systems and is typically considered to be dangerous and very expensive. On-site acid neutralization involves utilizing resources located adjacent to the OAE system to receive the acid substance as it leaves the IE stack, and to convert the acid substance into salt and water. On-site acid neutralization is considered safer and cheaper than the transporting option because it minimizes the storage and handling of the hazardous acid substance, and because (in some cases) the product of the acid neutralization process (i.e., salt and water) may be utilized by the OAE system. Moreover, because the widespread acceptance of OAE systems as a suitable NET may be predicated on minimizing each OAE system's cost per unit of captured/removed atmospheric $CO_2$ (LCOC), and because the cost of dealing with the acid substance is a component of an OAE system's LCOC, there is a strong motivation to implement on-site acid neutralization processes/systems. As mentioned above, acid neutralization generally involves mixing the acid substance with base (alkaline) materials under conditions that convert the acid molecules into salt and water molecules. Conventional acid neutralization processes typically involve reacting the acid substance with a base (alkaline) material such as NaOH, potassium hydroxide (KOH) or calcium carbonate ($CaCO_3$). Note that the NaOH base substance generated by an OAE system is earmarked for use in capturing atmospheric carbon and mitigating ocean acidification, so it would be counterproductive to neutralize the HCl generated by an OAE system using NaOH. KOH is typically produced in a manner similar to the electrochemical process performed by the IE stack (i.e., by electrolysis of a potassium chloride solution), and is therefore a relatively expensive base material. In contrast to other alkaline materials, $CaCO_3$ and $Ca(OH)_2$ can be easily extracted from several alkaline material sources (e.g., $CaCO_3$ from limestone and oyster shells and $Ca(OH)_2$ from unhardened concrete) that may be located near typical OAE system deployment locations, and therefore provides a cost-effective and readily available alkaline material for the acid neutralization process.

A further requirement for OAE system acid neutralization is that it achieves a zero (or very small) carbon and greenhouse gas footprint. Unfortunately, many readily available sources of alkaline material (e.g., unhardened concrete and other materials containing calcium carbonate $CaCO_3$, such as limestone and oyster shells) contain captured $CO_2$. This presents a problem because, when such alkaline materials are utilized in conventional acid neutralization approaches, the captured $CO_2$ is typically released into the atmosphere (i.e., atmospheric $CO_2$ is increased, thus generating a significant carbon footprint). Similarly, when another conventional base is used for acid neutralization, production of the conventional base is associated with a significant carbon footprint (e.g., in case of KOH, about 1.9 kg $CO_2$ e/kghttps://apps.carboncloud.com/climatehub-/productreports/id/1394351136979, and this amount does not include the $CO_2$ footprint associated with transporting the conventional base to the OAE system location). The unnecessary generation/release of $CO_2$ should be avoided in all cases, but this goal is particularly important when neutralizing the acid product generated by an OAE system (i.e., because the main purpose of an OAE system is to reduce atmospheric $CO_2$).

Another Negative Emission Technology currently being developed is directed to carbon mineralization. Carbon mineralization generally refers to natural and human-initiated processes by which certain minerals inside basaltic rocks react with atmospheric $CO_2$ to create carbonates (i.e., solid minerals that securely sequester the $CO_2$). This chemical reaction works best with mafic or ultramafic rocks, which contain alkaline minerals like magnesium or calcium-bearing silicates that are highly reactive to $CO_2$. Although carbon mineralization occurs naturally, the amount of $CO_2$ removed from the atmosphere by natural carbon mineralization is far below the rate at which $CO_2$ is currently being emitted into the atmosphere. Therefore, several human-initiated carbon mineralization processes are being developed to increase the rate at which $CO_2$ can be sequestered.

Human-initiated carbon mineralization processes generally include ex-situ or surficial (above ground) approaches and in-situ (below ground) approaches. Ex-situ carbon mineralization approaches involve reacting an alkaline feedstock (i.e., an aqueous solution including ground-up mafic or ultramafic rocks) with concentrated $CO_2$ in a high-pressure vessel. Superficial approaches generally involve reacting an alkaline feedstock with ambient or concentrated $CO_2$ at atmospheric pressures. In-situ carbon mineralization approaches involve injecting concentrated $CO_2$ into the ground in regions having alkaline geologies (i.e., geologies having a relatively high concentration of mafic or ultramafic rocks) to form carbonate minerals that sequester the $CO_2$.

Carbon mineralization processes require the presence of appropriate ions for mineralization (e.g., $Ca^{2+}$, $Mg^{2+}$, etc.) in solution to react with the $CO_2$ to create, e.g., CaCOs (limestone) or $CaMg(CO)_2$ (dolostone), etc. For example, when injected into an ultramafic rock (e.g., olivine having the chemical formula $(Mg,Fe)_2SiO_4$) using a conventional in-situ carbon mineralization process, the $CO_2$ requires dissociated divalent ions (e.g., $Mg^{2+}$) to form a mineral. To provide the required dissociated ions, the $CO_2$ may be injected in the form of carbon acid (i.e., with $CO_2$ and acid existing in equilibrium), whereby the carbon acid functions to dissolve rock to dissociate the $Mg^{2+}$ ions required for mineralization. A problem with this conventional in-situ carbon mineralization approach is that carbon acid is a relatively weak acid, so the carbon mineralization process takes a relatively long time.

In view of the above issues, what is needed is a safe and effective acid neutralization system that is capable of neutralizing the HCl byproduct from an OAE system (or another source) in a manner that minimizes costs and avoids the release of $CO_2$ into the atmosphere. What is particularly desirable is a system/method that combines HCl acid neutralization and in-situ carbon mineralization in a way that enhances an OAE system's ability to reduce existing atmospheric greenhouse gas concentrations (i.e., by combining ocean-based carbon capture with in-situ carbon mineralization). What is also needed is an enhanced in-situ carbon mineralization method that converts carbon at a faster rate than can be achieved using conventional in-situ carbon mineralization approaches.

SUMMARY OF THE INVENTION

In an embodiment an ocean alkalinity enhancement (OAE) system includes an in-situ acid neutralization subsystem configured to neutralize an acid substance (e.g., hydrochloric acid (HCl) and/or other seawater acid anions) generated by the OAE system's bipolar electrodialysis device (BPED). The BPED utilizes known techniques to electrochemically process salt (e.g., sodium chloride (NaCl)) in order to generate both a desired ocean alkalinity product containing a base substance (e.g., sodium hydroxide (NaOH)) and an acid byproduct solution including the acid substance (e.g., HCl). The OAE system disperses the ocean alkalinity product into an ocean in a way that both reduces atmospheric carbon dioxide ($CO_2$) and mitigates ocean acidification (i.e., such that the base substance is fully dissolved in seawater and located near the ocean surface). The in-situ acid neutralization subsystem generates an aqueous solution using some or all of the acid byproduct (i.e., such that the aqueous solution has an initial relatively high amount/concentration of the acid substance included in acid byproduct). The in-situ acid neutralization subsystem then injects (e.g., pumps or otherwise forces) the aqueous solution into an injection well such that it flows through a subterranean alkaline formation and exits through a recovery well. As used herein, the phrase alkaline formation refers to a subterranean strata or stratum of alkaline (e.g., mafic/ultramafic) rocks characterized by a network of pores and/or fractures that collectively form a flow channel extending from the injection well to the recovery well. As the injected aqueous solution flows along this flow channel, the acid substance interacts with and is neutralized by way of contact with the alkaline rocks, whereby the recovered aqueous solution (leachate) exiting at the recovery well has a lower concentration of acid substance than the initial aqueous solution forced into the injection well. To minimize operating costs and maximize safety, the acid neutralization subsystem optimizes the flow rate of the acid substance passing through (injected into) the alkaline formation such that (a) a maximum amount (i.e., a highest possible percentage) of the acid substance provided in the acid byproduct is included in the aqueous solution injected into the injection well (i.e., the amount of acid substance that can be neutralized by interaction with the alkaline rocks is maximized), and (b) a minimum amount of acid substance is present in the recovered aqueous solution exiting the alkaline formation through the recovery well. By providing an OAE system with an in-situ acid neutralization subsystem configured in this manner, the unwanted acid substance byproduct (i.e., HCl or other acid substance) of the electrochemical salt conversion process can be efficiently converted into a neutralized (relatively safe) product in a way that minimizes the OAE system's total operating costs. That is, maximizing the flow rate of acid substance through the alkaline formation minimizes the amount of acid substance that must be stored at the OAE system site—this is important because storing HCl (or other acid substances) at the OAE system site can significantly increase total operating costs and creates a potential safety hazard. Similarly, adjusting the acid substance flow rate such that all of the acid substance contained in the injected acid solution is neutralized as it passes through the alkaline formation minimizes the handling and storage costs associated with the recovered aqueous solution exiting at the recovery well.

In some embodiments the acid injection rate is automatically optimized by an electronic controller configured to utilize sensor data to monitor the amount of acid injected into and recovered from the alkaline formation and to adjust (increase/decrease) the acid injection rate by way of controlling a flow control subsystem. In one embodiment an upstream (first) sensor is configured to measure a first pH value and first flow rate of the acid byproduct received from the BPED, and a downstream (second) sensor is positioned and configured to measure a second pH value and second flow rate of the recovered aqueous solution exiting the alkaline formation at the recovery (monitoring) well. During operation the controller (e.g., either the OAE system's controller or a dedicated neutralization processor/controller) uses the first pH data and flow rate to determine the amount of acid substance to be neutralized (i.e., the rate at which acid substance is received from the BPED by way of the acid byproduct), and uses the second pH data and flow rate to determine the amount of residual acid substance present in the recovered aqueous solution exiting through the recovery/monitoring well. The controller then utilizes these determined amounts to control operations of the flow control subsystem (i.e., by way of one or more injection control signals) such that the acid substance flow rate (i.e., the amount of acid substance injected by way of the aqueous solution into the alkaline formation) is optimized. For example, when a significant amount of residual acid substance is detected in the recovered aqueous solution, which indicates that the alkaline formation is unable to neutralize all of the acid substance provided at a current acid substance flow rate, the controller may adjust the operation of the flow control subsystem to reduce the acid substance flow rate (e.g., to reduce the amount/concentration of acid substance in the injected aqueous solution and/or to reduce the flow rate of the injected aqueous solution) until the detected amount of residual acid substance in the recovered aqueous solution decreases to an insignificant/acceptable level. Conversely, when zero or an insignificant amount of residual acid substance is detected in the recovered aqueous solution, the controller may adjust the operation of the flow control subsystem to increase the amount/concentration of acid substance in the injected aqueous solution and/or the injected aqueous solution flow rate. By way of monitoring the rate of acid neutralization and adjusting the acid substance flow rate in this way, the acid substance flow rate may be optimized in an efficient automated manner, thereby minimizing OAE system operating costs.

In some embodiments the flow-control subsystem includes a conduit and a flow control device that are operably configured to control the injected acid substance flow rate (i.e., the amount/rate of acid substance injected into the alkaline formation). The conduit (e.g., a pipe or series of pipes) provides a flow passage from an input end, which is configured to receive the acid byproduct from the BPED, to an output end that is operably coupled to the injection well. In one embodiment the flow control device is an electrically operated valve (e.g., a metering valve or a control valve), an electrically operated pump, or another electrically operated device capable of controlling the acid substance flow rate injected through the output end of the conduit by modifying (i.e., increasing or decreasing in response to corresponding changes to the one or more injection control signals generated by the controller) the rate at which the acid byproduct is injected (i.e., by way of the aqueous solution) into the injection well.

In some embodiments the flow control subsystem utilizes a mixing apparatus to enhance the acid neutralization process by way of adjusting the acid concentration (pH) of the initial aqueous solution supplied to the alkaline formation by mixing the acid byproduct with a buffer solution (e.g., freshwater, seawater or brine) before injection into the alkaline formation. In these embodiments, the controller may be further configured to utilize upstream pH data and downstream data to determine a target acid concentration (or pH value) for the aqueous solution corresponding to the determined optimal acid substance flow rate, and may be configured to control (e.g., by way of one or more control signals) the amounts of acid byproduct and the buffer solution combined (mixed) by the mixing apparatus such that the aqueous solution injected into the alkaline formation (e.g., by way of a control valve or a control pump) has the target acid concentration (pH value). In an exemplary embodiment, the flow control subsystem utilizes multiple flow rate control devices to respectively control the flow rates of acid byproduct and buffer solution into a mixing tank (i.e., such that the resulting mixture in the mixing tank has the target acid concentration), and then the aqueous solution mixture is pumped into the alkaline formation at a flow rate determined by a control pump. Controlling the chemical composition of the initial aqueous solution in this manner further facilitates generation of the aqueous solution mixture according to the determined optimal acid substance flow rate.

In some embodiments the recovered (i.e., post-neutralization) aqueous solution exiting the alkaline formation is processed by a suitable alkaline processing system to generate a commercially valuable alkaline product. That is, the recovered aqueous solution exiting through the recovery well will be neutralized and very likely rich in inorganic compounds such as magnesium chloride ($MgCl_2$). Such recovered aqueous solution may serve as a concentrated feed for processing by an electrolysis system/ionic exchange membrane crystallizer (alkaline processing system) in order to generate magnesium hydroxide ($Mg(OH)_2$) as the alkaline product. In other embodiments, a suitable alkaline processing system may be configured to precipitate $MgCl_2$ which may then be used to produce metallic magnesium as the alkaline product. In each case, the generation of a commercially valuable alkaline product may serve to further reduce the overall OAE system operating costs. Note that, in the context of producing an alkaline product, the acid substance (e.g., HCl) generated as a byproduct by the OAE system effectively acts as a lixiviant that performs leach mining within the alkaline formation during the in-situ neutralization process.

In some embodiments the acid neutralization subsystem of an OAE system is further configured to substantially simultaneously perform both in-situ acid neutralization and in-situ carbon mineralization. Similar to the role of carbonic acid in conventional in-situ carbon mineralization, interactions between the hydrochloric acid (or other acid substance generated as an OAE system byproduct) and the alkaline rocks during the in-situ acid neutralization process (described above) generate dissociated divalent ions (e.g., $Mg^{2+}$ and/or $Ca^{2+}$) in the pores/fractures between the alkaline rocks along the flow channel. Moreover, as in conventional in-situ carbon mineralization, the dissociated divalent ions generated in the alkaline formation may be utilized for in-situ carbon mineralization. To perform both in-situ acid neutralization and in-situ carbon mineralization, the flow-control subsystem is further modified to receive a supply of $CO_2$ and the controller is configured to control the flow control device such that the $CO_2$ is injected into the alkaline formation by way of the injection well such that it passes through the flow channel between/through the alkaline rocks, whereby a reaction between the $CO_2$ and the dissociated divalent ions mineralizes the $CO_2$ in the form of solid and stable carbonate rocks. In some embodiments the $CO_2$ is injected in the form of a pressurized gas or dissolved in a liquid media (e.g., a solution including permeate generated by the OAE system's BPED). In some embodiments the $CO_2$ and injected acid solution are commingled at the bottom of the injection well to maximize $CO_2$ solubility. Combining in-situ acid neutralization and in-situ carbon mineralization in this way enhances the OAE system's ability to reduce existing atmospheric greenhouse gas concentrations (i.e., by supplementing the OAE system's ocean-based carbon capture with the carbon capture achieved by in-situ carbon mineralization) without significantly increasing the OAE system's operating costs.

According to another embodiment, an enhanced in-situ carbon mineralization (carbon capture) method is achieved by combining the above-described HCl-based in-situ acid neutralization process with in-situ carbon mineralization. That is, utilizing HCl (e.g., generated by an OAE system's BPED or from another source) to generate the dissociated divalent ions needed for carbon mineralization significantly increases the CO: mineralization rate because the HCl provided in the aqueous solution facilitates rock dissolution at a substantially higher rate (i.e., in comparison to carbonic acid), which ultimately leads to a higher total capacity of potential mineralized $CO_2$ per mass of rock. Accordingly, in addition to functioning as part of an OAE system, the in-situ acid neutralization subsystem may serve as a stand-alone carbon capture system that achieves enhanced carbon mineralization by way of injecting an aqueous solution containing HCl into an alkaline formation during a first time period, and then injecting $CO_2$ into the alkaline formation during a second time period. During the first time period, the injected aqueous solution travels through pores 62 between alkaline rocks (aka, alkalic rocks; e.g., mafic/ultramafic rocks) that collectively form the alkaline formation, whereby an interaction between the HCl and the alkaline rocks both neutralizes the HCl and generates dissociated divalent ions (e.g., $Mg^{2+}$ and $Ca^{2+}$). During the second time period, the injected $CO_2$ travels through the pores/fractures, whereby a reaction between the $CO_2$ and the dissociated divalent ions mineralizes the $CO_2$ in the form of solid and stable carbonate rocks (e.g., $CaCO_3$ (limestone) or $CaMg(CO_3)_2$ (dolostone)). The injection rate of aqueous solution (that is, the volumetric rate of acid injection compared to the volume and porous base of rock) can be adjusted so that the pH after dissolution of the rock is an ideal range for $CO_2$ mineralization. In some embodiments, acid injection can occur again (i.e., following a $CO_2$ injection) when rock dissolution rates start to slow or carbonate mineralization formation leads to blockage of pores (flow channels through the rock) or in combination with proppants to fracture the formation and avoid closure. In some embodiment, each acid injection occurs before an associated $CO_2$ injection or a series of $CO_2$ injections (e.g., acid solution is injected at time T1, then $CO_2$ is injected at times T2, T3, etc.). The combination of in-situ acid neutralization and $CO_2$ injection facilitates long term storage (i.e., greater than 1,000 years) of $CO_2$ within the alkaline formation.

BRIEF DESCRIPTION OF THE DRAWINGS

These and other features, aspects and advantages of the present invention will become better understood with regard to the following description, appended claims, and accompanying drawings, where:

FIGS. 4A and 4B are diagrams depicting a partial in-situ acid neutralization subsystem according to another embodiment, where FIG. 4A depicts the subsystem during a first time period when configured to perform an in-situ acid neutralization operation, and FIG. 4B depicts the subsystem during a second time period when configured to perform an in-situ carbon mineralization operation; and FIGS. 5A and 5B are simplified diagrams depicting an acid neutralization process and a carbon mineralization process that occur during the operating states depicted in FIGS. 4A and 4B, respectively.

DETAILED DESCRIPTION OF THE DRAWINGS

In some embodiments the present invention relates to an improvement in methods and apparatus/systems for in-situ acid neutralization, and more specifically to the in-situ neutralization of acid generated by an OAE system. In some embodiments the present invention relates to an improvement in methods and apparatus/systems for in-situ carbon mineralization (carbon capture). The following description is presented to enable one of ordinary skill in the art to make and use the invention as provided in the context of a particular application and its requirements. As used herein, directional terms such as "above" and "below", are intended to provide relative positions for purposes of description and are not intended to designate an absolute frame of reference. Various modifications to the preferred embodiment will be apparent to those with skill in the art, and the general principles defined herein may be applied to other embodiments. Therefore, the present invention is not intended to be limited to the particular embodiments shown and described but is to be accorded the widest scope consistent with the principles and novel features herein disclosed.

Figure 1:
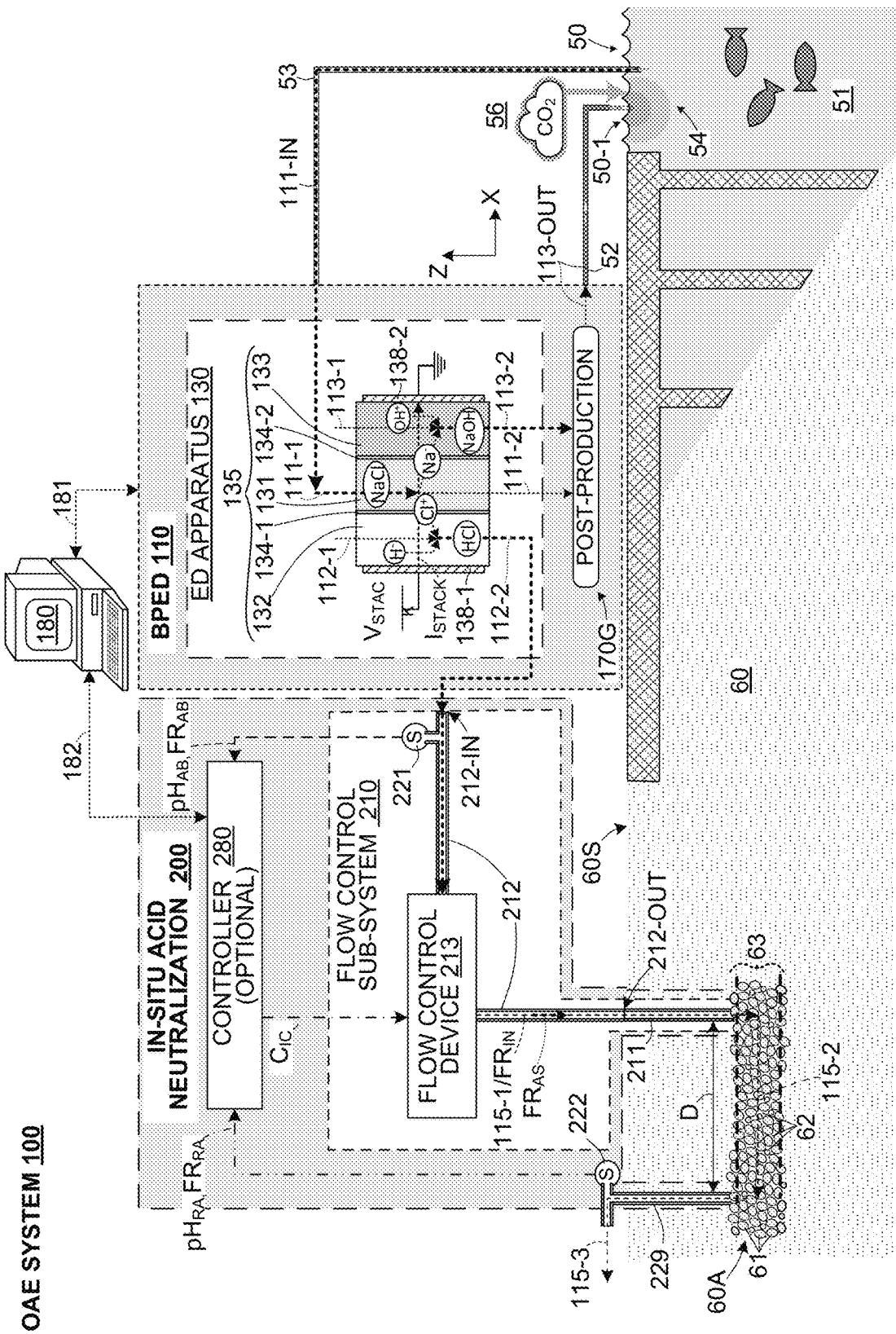
FIG. 1 is a diagram depicting an OAE system including an in-situ acid neutralization subsystem according to an embodiment.

FIG. 1 shows an OAE system 100 including at least one BPED 110, a control circuit 180 and an in-situ acid neutralization subsystem 200 according to a simplified embodiment of the present invention. In preferred embodiments, OAE system 100 is located both near an ocean 50 and over or near an alkaline formation 60A.

BPED 110 generally includes an electrodialysis (ED) apparatus 130, one or more post-production devices 170 and flow control resources (not shown in FIG. 1). As described in additional detail below, ED apparatus 130 functions to electrochemically process (convert) salt (NaCl) provided in feedstock solution 111-IN into a base substance (NaOH) that is fully dissolved in an aqueous base product 113-2 and an acid substance (HCl) disposed in an aqueous acid byproduct 112-2. Post-production devices 170 are configured to generate ocean alkalinity product 113-OUT using base product 113-2 generated by ED apparatus 130, and to supply ocean alkalinity product 113-OUT to ocean 50. In this way, BPED 110 electrochemically processes salt provided in feedstock solution 111-IN to generate ocean alkalinity product 113-OUT containing NaOH and acid byproduct 112-2 containing HCl. In practical embodiments, BPED 110 generates and supplies a sufficient amount of ocean alkalinity product 113-OUT to increase the alkalinity of a designated region of ocean 50, thereby both reducing atmospheric $CO_2$ and mitigating ocean acidification. In some embodiments, feedstock solution 111-IN includes seawater 51 that is pumped directly from ocean 50 through an inflow transfer well pipe 53. In other embodiments (not shown), feedstock solution 111-IN may comprise brine generated by a brine source (e.g., a desalination plant or a water recycling plant that processes seawater and generates brine as a byproduct).

ED apparatus 130 generally includes an ion exchange (IE) stack 135 that is disposed between two electrodes (i.e., anode 138-1 and cathode 138-2). IE stack 135 typically includes multiple cells arranged in series between electrodes 138-1 and 138-2, where each cell includes three chambers that respectively serve as parallel flow channels for the aqueous salt, acid and base solutions as they pass through IE stack 135. For brevity and clarity, only one cell of IE 135 is depicted in FIG. 1, which is made up of a salt chamber 131 that functions to channel a portion of the salt feedstock solution, an acid chamber 132 that channels a portion of the acid solution, and a base chamber 133 that channels a portion of the base solution. Each cell's salt chamber 131 is disposed between and separated from the cell's acid chamber 132 and base chamber 133 by corresponding ion exchange membranes 134-1 and 134-2, which are configured to facilitate the transfer of sodium and chloride ions from the salt chamber into the base and acid chambers during the electrochemical process as described below. Electrodialysis apparatus 130 also includes manifold or other structures (not shown) that are configured to cooperate with the flow control resources of BPED 110 to direct the three different (i.e., a salt feedstock, acid and base) aqueous solutions through corresponding salt/acid/base chambers of IE stack 135. Specifically, the aqueous salt feedstock solution enters IE stack 135 as a strong salt stream 111-1 that is divided and directed (e.g., by an input manifold, not shown) into the inlet of each cell's salt flow channel 131, and the aqueous salt feedstock solution exits the IE stack 135 by way of an outlet of each cell's salt flow channel 131 (and an outlet manifold, not shown) as a weak/depleted salt stream (permeate) 111-2. Similarly, the acid solution enters IE stack 135 as a weak acid stream 112-1 that is directed into the inlet of each cell's acid flow channel 132 and exits the IE stack 135 by way of an outlet of each cell's acid flow channel 132 as a strong acid stream (acid byproduct) 112-2. Finally, the aqueous base solution enters IE stack 135 as a weak base stream 113-1 that is directed into the inlet of each cell's base flow channel 133 and exits the IE stack 135 by way of an outlet of each cell's base flow channel 133 as a strong base stream (base product) 113-2.

ED apparatus 130 performs the electrochemical process when the three aqueous solutions are directed through IE stack 135 along parallel flow paths (e.g., parallel to the Z-axis direction) while a stack voltage $V_{STACK}$ is applied to electrodes 138-1 and 138-2. When stack voltage $V_{STACK}$ is sufficiently strong, the resulting electric field produces an ionic current across IE stack 135 in a direction perpendicular to the parallel flow paths (e.g., in the X-axis direction), whereby anions in the aqueous salt/base/acid solution streams (e.g., chloride ions (Cl−) and hydroxide ions (OH−)) move toward anode 138-1 and cations in the aqueous solution streams (e.g., sodium ions ($Na^+$) and protons ($H^+$))

move toward the cathode 138-2. This ionic current causes dissociated salt molecules (i.e., sodium ions ($Na^+$) and chloride ions ($Cl^-$)) to exit strong salt stream 111-1 in opposite directions (i.e., such that the chloride ions ($Cl^-$) pass through ion exchange filter 138-1 from salt chamber 131 into the acid chamber 132, and the sodium ions ($Na^+$) pass through ion exchange filter 138-2 into base chamber 133). The chloride ions ($Cl^-$) then combine with protons ($H^+$) to form "new" acid (HCl) molecules in the acid solution stream flowing through acid chamber 132, and the sodium ions ($Na^+$) combine with hydroxide ions ($OH^-$) to form "new" base (NaOH) molecules in the base solution stream flowing through base chamber 133. As a result of this electrochemical salt-conversion process, strong base stream (base product) 113-2 exits each cell's base chamber 133 with a significantly higher concentration of base substance than that of weak base stream 113-1 (i.e., as it enters IE stack 135). Similarly, strong acid stream (acid byproduct) 112-2 exiting each cell's acid chamber 132 has a higher concentration of acid substance than that of weak acid stream 112-1. Note that, because salt is converted (consumed) to generate the acid and base substances, weak/depleted salt solution stream 111-2 exiting each cell's salt chamber 131 has a lower salt content than strong salt feedstock stream 111-1 (i.e., as it enters IE stack 135).

As indicated below IE stack 135, post-production device 170 receives portions of one or more of the aqueous solution streams leaving IE stack 135 and is configured to generate ocean alkalinity product 113-OUT using the base substance provided in at least a portion of strong base stream 113-2, and to supply ocean alkalinity product 113-OUT to ocean 50 at an outfall location 50-1.

Additional information regarding the configuration and operation of BPED 110 is provided in co-owned and co-pending U.S. patent application Ser. No. 18/131,839, filed Apr. 6, 2023, entitled PRODUCTION EFFICIENCY OPTIMIZATION FOR BIPOLAR ELECTRODIALYSIS DEVICE, which is incorporated herein by reference in its entirety.

Control circuit 180 can be an electronic device (e.g., a computer/processor or dedicated electronic device) that implements software-based instructions or is otherwise configured to execute various system-related software-based programs including a BPED operating method that controls the operations performed by BPED 110 by way of control signals 181, and may execute other control algorithms/processes that control the operations of other system devices (not shown). In some embodiments, system controller 180 is configured to coordinate operations of BPED 110 and in-situ acid neutralization subsystem 200 (e.g., by way of control signals 182) such that acid neutralization subsystem 200 operates as described below to neutralize HCl immediately after being generated by the BPED 110, thereby minimizing the amount of acid product that must be stored before it can be processed by acid neutralization subsystem 200, and minimizing or eliminating the safety danger and expense associated with prolonged storage or transportation of the hazardous acid byproduct 112-2. Such system-controller-to-neutralization-controller communications may include safety messages, for example, that cause the BPED 110 to terminate or reduce acid production operations when acid neutralization subsystem 200 may be experiencing technical failure.

Referring to the left side of FIG. 1, in-situ acid neutralization subsystem 200 is configured to receive at least a portion of acid byproduct (strong acid stream) 112-2 from BPED 110, and functions to neutralize the acid substance (e.g., HCl and/or other seawater acid anions) provided in acid byproduct 112-2 by way of reaction with alkaline minerals disposed in an alkaline formation 60A.

As used herein, alkaline formation 60A refers to a subterranean strata or stratum of alkaline (e.g., mafic/ultramafic) rocks 61 found within ground (earth) 60 and characterized by a network of pores and/or fractures 62 that collectively form a flow channel 63 extending between an injection well 211 and a recovery well 229. The length of flow channel 63 is indicated by a distance D between injection well 211 and recovery well 229, and generally represents the amount of alkaline rock surface area contacted by injected aqueous solution 115-2 as it flows from injection well 211 and recovery well 229. Note that the amount of alkaline rock surface area contacted by injected aqueous solution 115-2 is typically proportional to the amount of acid neutralization, so the acid neutralization capacity of alkaline formation 60A may be increased/decreased by way of increasing/decreasing the distance D between injection well 211 and recovery well 229, where distance D depends on various factors such as injection rates, rock alkalinity, porosity, permeability, etc. In ideal cases, alkaline formation 60A includes a naturally occurring network of pores/fractures 62 that collectively form a suitable flow channel 63 through alkaline rocks 61. In some cases, alkaline rock 61 may have to be fractured (e.g., using known fracking or acid fracturing techniques) to provide flow channel 63.

In the generalized embodiment shown in FIG. 1, acid neutralization subsystem 200 includes a flow-control subsystem 210, an upstream (first) sensor 221, a downstream (second) sensor 222, and a controller 280.

Flow-control subsystem 210 is configured to receive acid byproduct 112-2 from BPED 110, to generate an aqueous solution that includes at least a portion of acid byproduct 112-2, and to inject (i.e., pump or otherwise force) the aqueous solution such that it passes through alkaline formation 60A. In the exemplary embodiment, flow control subsystem includes a conduit 212 and a flow control device 213. Conduit 212 (e.g., one or more pipes) has an input end 212-IN configured to receive acid byproduct 112-2 from BPED 110 and has an output end 212-OUT operably coupled to injection well 211. Flow control device 213 is operably coupled to conduit 212 between input end 212-IN and output end 212-OUT and is configured to control a flow rate $FS_{AS}$ of the acid substance that injected into alkaline formation 60A by way of injection well 211. As set forth in the embodiments described below with reference to FIGS. 2A and 2B, flow control device 213 controls flow rate $FS_{AS}$ by modifying (i.e., increasing or decreasing) a rate at which acid byproduct 112-2 is injected (i.e., by way of the aqueous solution 115-1) into injection well 211 in response to corresponding changes to the one or more injection control signals $C_{IC}$, which are generated by the controller 280 in the manner described below.

For descriptive purposes, the aqueous solution generated by flow-control subsystem 210 is divided into three portions: initial aqueous solution 115-1 (i.e., the portion of aqueous solution that is leaving flow-control subsystem 210 but has not yet reached alkaline formation 60A); injected aqueous solution 115-2 (i.e., the portion of aqueous solution that is currently passing through alkaline formation 60A); and recovered aqueous solution 115-3 (i.e., portion of aqueous solution that has exited alkaline formation 60A). As set forth below, initial aqueous solution 115-1 has the highest acid concentration of the three sections, and its acid concentration does not significantly change during the initial injection process. In contrast, the acid concentration of injected acid solution 115-2 gradually decreases as it flows from injection well 211 to recovery well 229 (i.e., as explained below, this is due acid neutralization caused by interaction between the acid substance and alkaline rocks 61). Finally, recovered aqueous solution 115-3 has the lowest acid concentration of the three sections, and its acid concentration does not significantly change after leaving flow channel 63 and exiting alkaline formation 60A via recovery well 229.

Upstream (first) sensor 221 is configured to measure first acid substance parameters occurring in acid byproduct 112-2 that may be used by controller 280 to determine a total available (first) amount of acid substance contained in acid byproduct 112-2 (i.e., the total amount of acid byproduct generated by BPED 110 that must be neutralized). In the embodiment shown in FIG. 1, the measured acid substance parameters include a pH level and a flow rate of acid byproduct 112-2. Sensor 221 is also configured to generate associated data signals (first data) that indicate the measured first acid substance parameters. In the embodiment shown in FIG. 1, the first data signals include an acid byproduct pH level $pH_{AB}$ corresponding to the measured acid byproduct pH level, and an acid byproduct flow rate value $FR_{AB}$ corresponding to the measured flow rate of acid byproduct 112-2. In alternative embodiments, these parameters are measured and converted to associated data signals either periodically (e.g., once per minute) or on a substantially continuous basis (e.g., multiple times per second). In one embodiment first data signals $pH_{AB}$ and $FR_{AB}$ are transmitted to controller 280, which utilizes the corresponding pH level and flow rate values to calculate or otherwise determine the (first) acid substance amount contained in acid byproduct 112-2. In other embodiments (not shown), the measured pH level and flow rate values (and/or zero or more other measured parametric values) are utilized by a processor mounted on sensor 221 to calculate the first acid substance amount, and sensor 221 generates a corresponding first data signal including the first acid substance amount that is then transmitted to controller 280.

Downstream (second) sensor 222 is configured to measure residual (second) acid substance parameters associated with a residual (second) amount of acid substance contained in the recovered aqueous solution 115-3 exiting alkaline formation 60A through recovery well 229. In the embodiment shown in FIG. 1, the measured residual acid substance parameters include a pH level and a flow rate of recovered aqueous solution 115-3. Sensor 222 is also configured to generate associated second data signals (second data) that indicate the measured residual acid substance parameters. In the embodiment shown in FIG. 1, the second data signals include a recovered aqueous solution pH level $pH_{RA}$ corresponding to the measured recovered solution pH level, and a residual aqueous solution flow rate value $FR_{RA}$ corresponding to the measured flow rate of recovered aqueous solution 115-3. In alternative embodiments, these parameters are measured and converted to associated data signals either periodically or on a substantially continuous basis. In one embodiment second data signals $pH_{RA}$ and $FR_{RA}$ are transmitted to controller 280, which utilizes the corresponding pH level and flow rate values to calculate or otherwise determine the residual (second) acid substance amount contained in recovered aqueous solution 115-3. In other embodiments (not shown), the measured pH level and flow rate values are utilized by a processor mounted on sensor 222 to calculate the residual acid substance amount, and sensor 222 generates a corresponding second data signal including the residual acid substance amount that is then transmitted to controller 280.

Controller 280 is configured to utilize the first data signals $pH_{AB}$ and $FR_{AB}$ to determine the initial (first) amount of acid substance included in acid byproduct 112-2, configured to utilize second data signals $pH_{RA}$ and $FR_{RA}$ to determine the residual (second) amount of acid substance exiting through recovery well 229, and to generate an injection control signal $C_{IC}$ in accordance with a relationship between the first and second amounts. In an embodiment, the relationship between the first and second amounts is controller 280 utilizes the first and second data signals to optimize a flow rate $FS_{AS}$ of acid substance (e.g., HCl) injected into alkaline formation 60A by way of initial aqueous solution 115-1 such that (a) a maximum amount (highest possible percentage) of the acid substance (e.g., HCl) provided in acid byproduct 112-2 is included in initial aqueous solution 115-1 injected into the injection well 211 (i.e., the maximum amount of acid substance that can be neutralized by interaction with alkaline rocks 61 is maximized), and (b) a minimum amount of acid substance is present in recovered aqueous solution 115-3, which exits the alkaline formation 60A through recovery well 229. In an exemplary embodiment, controller 280 utilizes first data signals $pH_{AB}$ and $FR_{AB}$ to determine the total amount of acid substance provided by acid product 112-2 and utilizes one or more of second data signals $pH_{RA}$ and $FR_{RA}$ to determine the amount of residual acid substance (residual acid amount) present in recovered aqueous solution 115-3. By way of example, condition (a) is met if initial aqueous solution 115-1 includes all of acid byproduct 112-2, and condition (b) is met if second data signal pH fails to detect any significant acid substance in recovered aqueous solution 115-3 (e.g., the value of data signal $pH_{RA}$ is a neutral pH of 7). When condition (b) is not met (e.g., data signal $pH_{RA}$ has a value of pH 8 or higher, indicating a significant amount of acid substance contained in recovered aqueous solution 115-3), then controller 280 modifies one or more of injection control signals $C_{IC}$ transmitted to flow control subsystem 210 such that acid substance flow rate $FS_{AS}$ is reduced (e.g., by way of reducing the amount of acid byproduct 112-2 included in initial aqueous solution 115-1, or by reducing the flow rate $FR_{IN}$ of initial aqueous solution 115-1). By configuring flow-control subsystem 210 to generate initial aqueous solution 115-1 such that acid substance flow rate $FS_{AS}$ is modified (increased or decreased) in this way (i.e., in response to injection control signal(s) $C_{IC}$ generated and transmitted from controller 280), in-situ acid neutralization subsystem 200 provides an automated apparatus for optimizing the acid byproduct generated by OAE system 100. In some embodiments the functions performed by controller 280 may be performed by controller 180 (i.e., controllers 180 and 280 may be combined).

Figure 2A:
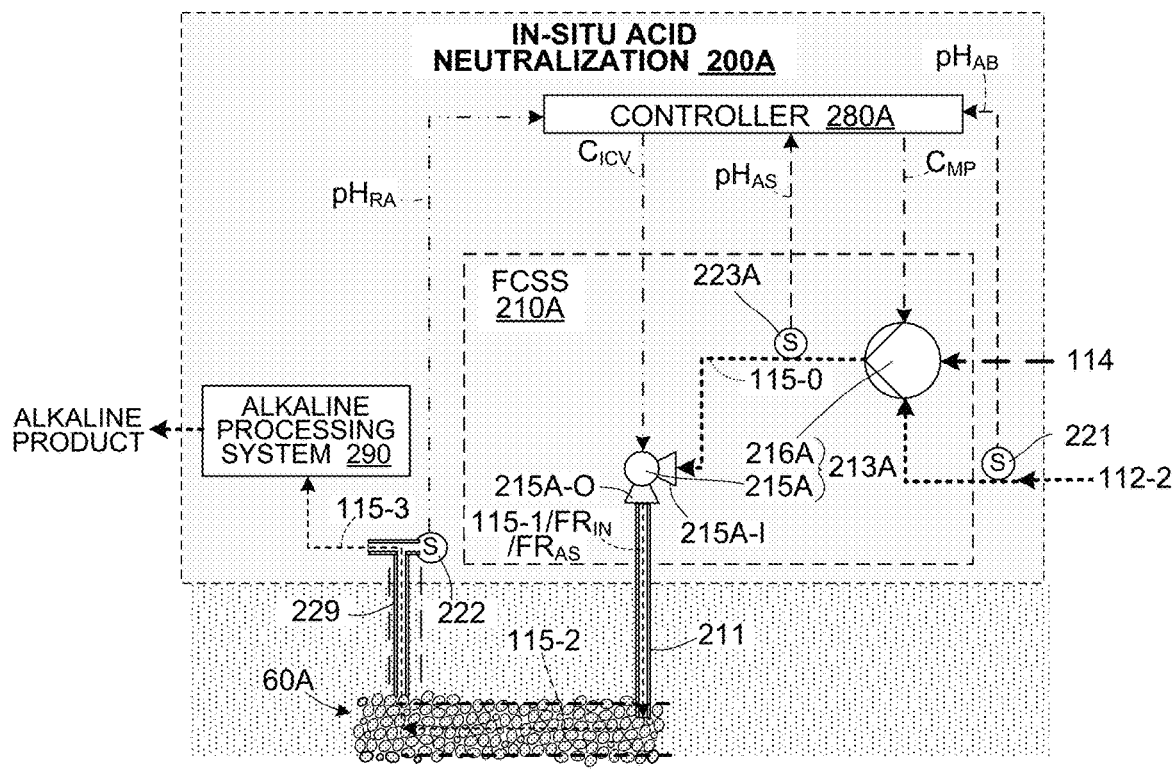
FIGS. 2A and 2B are diagrams depicting exemplary in-situ acid neutralization subsystems according to alternative specific embodiments.
Figure 2B:
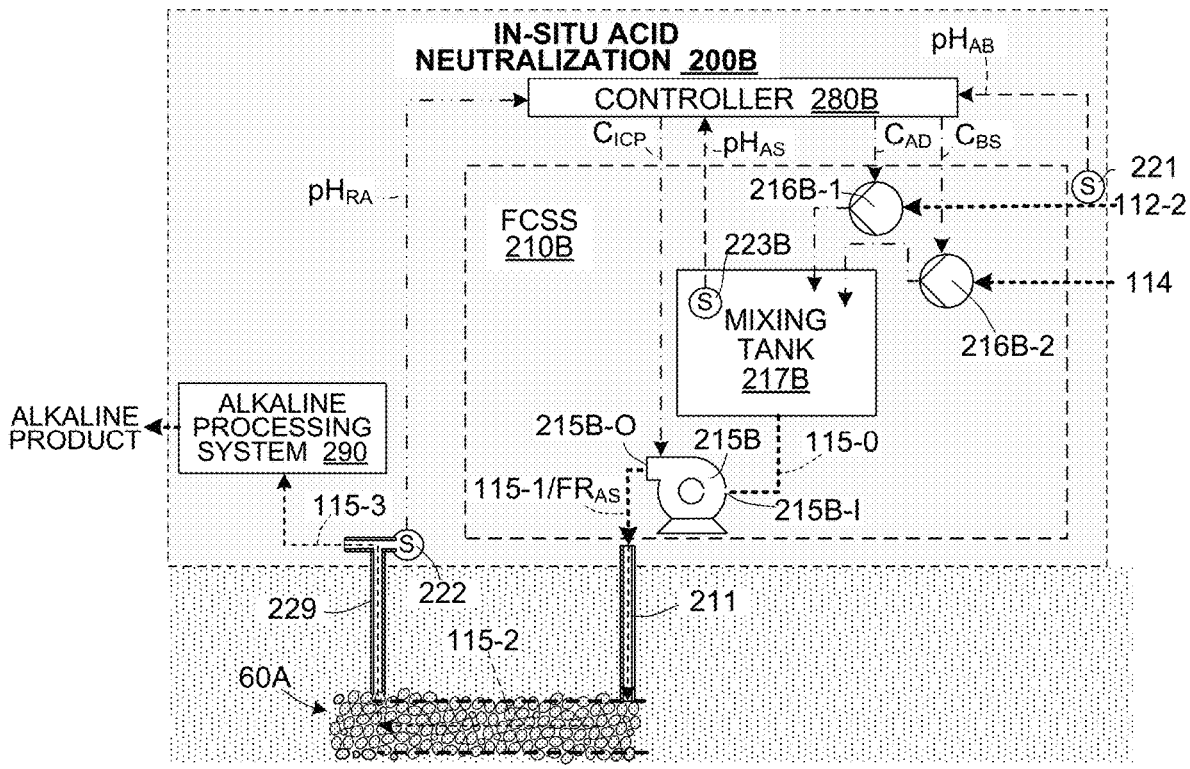

FIGS. 2A and 2B respectively show in-situ acid neutralization subsystems 200A and 200B according to alternative specific embodiments, where in-situ acid neutralization subsystem 200A (FIG. 2A) includes a flow control subsystem (FCSS) 210A and a controller 280A, and in-situ acid neutralization subsystem 200B (FIG. 2B) includes a flow control subsystem (FCSS) 210B and a controller 280B. As set forth in additional detail below, both FCSS 210A and FCSS 210B are configured to generate initial aqueous solution 115-1 by mixing acid byproduct 112-2 with a buffer solution 114 (e.g., permeate freshwater, seawater or brine), and are further configured to control an injection flow rate $FR_{IN}$ of initial aqueous solution 115-1 such that the acid substance contained in initial aqueous solution 115-1 enters alkaline formation 60A at an optimized acid solution flow rate $FR_{AS}$. As also set forth below, controllers 280A and 280B are similar in that each is configured to utilize sensor data from upstream and downstream sensors to determine an optimized acid solution flow rate $FR_{AS}$, and to control flow control subsystems 210A and 210B such that an acid concentration and injection flow rate $FR_{IN}$ of initial aqueous solution 115-1 produces the calculated optimized acid solution flow rate $FR_{AS}$. That is, each controller 280A and 280B determines both a target acid concentration value and an injection flow rate for initial aqueous solution 115-1 that would produce the calculated optimized acid solution flow rate $FR_{AS}$, and then controls flow control subsystems 210A and 210B by way of corresponding control signals such that initial aqueous solution 115-1 is generated and injected at the determined target acid concentration value and injection flow rate. Either neutralization subsystem 200A or neutralization subsystem 200B may be used in place of neutralization subsystem 200 in the OAE system shown in FIG. 1. Additional features of in-situ acid neutralization subsystems 200A and 200B are described below.

Referring to FIG. 2A, FCSS 210A includes a mixing pump 216A and a control valve 215A that collectively form a flow control device 213A capable of generating initial aqueous solution 115-1 with optimized acid substance flow rate $FR_{AS}$ in response to control signals generated by controller 280A. Mixing pump 216A has a first flow input configured to receive acid byproduct 112-2 from BPED 110 (shown in FIG. 1), a second flow input coupled to a suitable source of buffer solution 114, and a control input terminal configured to receive a mixing pump control signal $C_{MP}$ from controller 280A. Mixing pump 216A is configured to ingest and mix acid byproduct 112-2 and buffer solution 114 in a proportion determined by mixing pump control signal $C_{MP}$ such that an aqueous solution mixture 115-0 expelled through an outlet port of mixing pump 216A has an acid concentration (i.e., a proportion of acid substance to other components of the aqueous solution) that is equal to a target acid concentration value. Control valve 215A has a valve inlet 215A-I configured to receive aqueous solution mixture 115-0, a valve outlet 215A-O that is operably coupled to injection well 211, and a control input terminal configured to receive an injection control signal $C_{ICV}$ from controller 280A. Control valve 215A is configured to control injection flow rate $FR_{IN}$ of initial aqueous solution mixture 115-1 as it enters injection well 211.

Controller 280A utilizes the data signals $pH_{AB}$ and $pH_{RA}$ received from upstream sensor 221 and downstream sensor 222, respectively, to determine an optimized acid substance flow rate $FR_{AS}$ (as described above). Controller 280A also calculates a target acid concentration value and an injection flow rate that correspond to the optimized acid substance flow rate $FR_{AS}$, and then generates/transmits mixture control signal $C_{MP}$ and injection control signal $C_{ICV}$ in accordance with the calculated target acid concentration and injection flow rate values, thereby controlling FCSS 210A to produce initial aqueous solution 115-1 with the optimized acid substance flow rate $FR_{AS}$ (as described above). In some embodiments controller 280A utilizes sensor data $pH_{AS}$ generated by a third sensor 223A located downstream from mixing pump 216A to verify that aqueous solution mixture 115-0 is generated at the target acid concentration. Accordingly, the injection of aqueous solution into alkaline formation 60A involves directing aqueous solution mixture 115-0 to valve inlet 215A-I of control valve 215A and utilizing electronic injection control signal $C_{ICV}$ to actuate control valve 215A such that initial aqueous solution 115-1 flows from outlet 215A-O of control valve 215A and through injection well 211 into alkaline formation 60A at injection flow rate $FR_{IN}$.

Referring to FIG. 2B, FCSS 210B includes a mixing apparatus formed by an acid dosing pump (first flow rate control device) 216B-1, a buffer dosing pump (second flow rate control device) 216B-2, a mixing tank 217B and a control pump 215B. Acid dosing pump 216B-1 has a flow input configured to receive acid byproduct 112-2 from BPED 110 (shown in FIG. 1) and is controlled to expel acid byproduct 112-2 into mixing tank 217B at a (first) flow rate determined by an acid dosing pump control signal $C_{AD}$, which is generated by controller 280B. Buffer dosing pump 216B-2 has a flow input configured to receive buffer solution 114 from a suitable source and is controlled to expel acid byproduct 112-2 into mixing tank 217B at a (first) flow rate determined by a buffer dosing pump control signal CBS. Mixing tank 217B mixes and stores an aqueous solution mixture 115-0 comprising acid byproduct 112-2 and buffer solution 114 received from acid dosing pump 216B-1 and buffer dosing pump 216B-2, respectively, whereby an acid concentration of aqueous solution mixture 115-0 is determined by the first flow rate of acid byproduct 112-2 and the second flow rate of buffer solution 114. Control pump 215B has a pump inlet 215B-I configured to receive aqueous solution mixture 115-0 from mixing tank 217B, a pump outlet 216B-O coupled to injection well 211, and a control input terminal configured to receive an injection control signal $C_{ICP}$ from controller 280B. Control pump 215B is configured to control injection flow rate $FR_{IN}$ of initial aqueous solution mixture 115-1 as it is injected into injection well 211.

Similar to controller 280A (FIG. 2A), controller 280B receives and utilizes first data $pH_{AB}$ from upstream sensor 221 and second data $pH_{RA}$ from downstream sensor 222 to calculate a target acid concentration value, and then generates/transmits corresponding dosing pump control signals $C_{BS}$ and $C_{AD}$ such that FCSS 210B generates aqueous solution mixture 115-0 in mixing tank 217B in accordance with the target acid concentration. In some embodiments controller 280B utilizes sensor data $pH_{RAS}$ generated by a third sensor 223B located in mixing tank 217B to verify that aqueous solution mixture 115-0 is generated at the target acid concentration. Subsequent injection of the aqueous solution into alkaline formation 60A involves directing aqueous solution mixture 115-0 to pump inlet 215B-I of control pump 215B and utilizing electronic pump control signal $C_{ICP}$ to actuate control pump 215B such that initial aqueous solution 115-1 is forced by control pump 215B through pump outlet 215B-O and injection well 211 into alkaline formation 60A at the injection flow rate $FR_{IN}$.

As indicated in both FIGS. 2A and 2B, neutralization subsystems 200A and 200B are further characterized by including an optional alkaline processing system 290 configured to generate an alkaline product (e.g., $Mg(OH)_2$ or metallic magnesium) by receiving and processing recovered aqueous solution 115-3 as it exits alkaline formation 60A through recovery well 229. This feature takes advantage of the chemical change to the alkaline rocks caused by the acid substance (e.g., HCl) as injected aqueous solution passes through alkaline formation 60A, whereby the acid substance effectively acts as a lixiviant that performs leach mining during the in-situ neutralization process. As a result, recovered aqueous solution 115-3 may be rich in inorganic compounds such as magnesium chloride ($MgCl_2$), and may therefore serve as a concentrated feed for processing by an electrolysis system/ionic exchange membrane crystallizer (or other alkaline processing system) in order to generate magnesium hydroxide (Mg(OH)$_2$) as the alkaline product. In other embodiments, alkaline processing system 290 may be configured to precipitate the MgCl$_2$, which may then be used to produce metallic magnesium as the alkaline product. The commercial sale of such alkaline products may serve to further reduce the overall OAE system operating costs.

Figure 3:
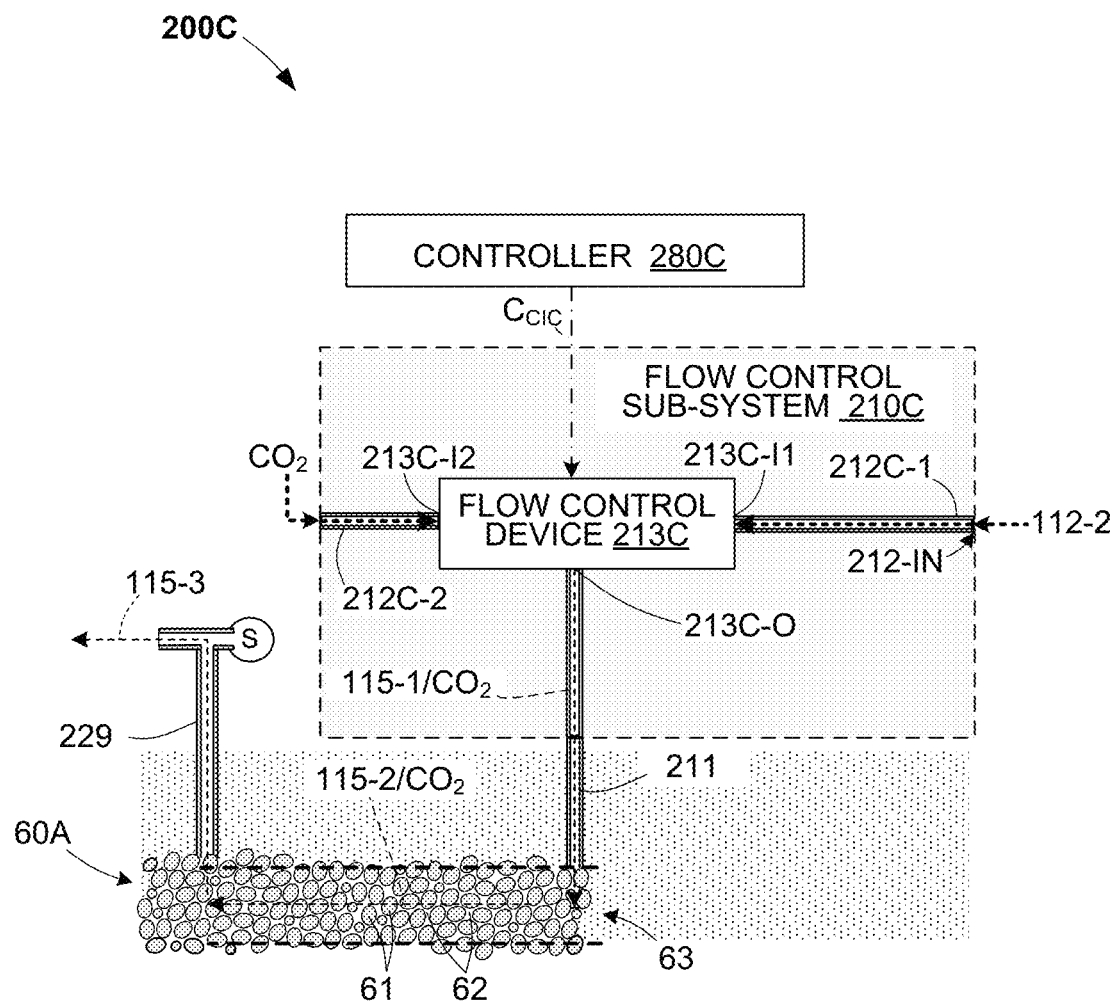
FIG. 3 is a diagram depicting an exemplary in-situ acid neutralization subsystem that is modified to perform in-situ carbon mineralization according to another embodiment.

FIG. 3 shows an exemplary in-situ acid neutralization subsystem 200C according to another embodiment in which flow control subsystem 210C is modified (i.e., in comparison to the embodiments described above) to facilitate CO$_2$ mineralization/storage and removal within alkaline formation 60A. Note that flow control subsystem 210C is shown in a simplified form similar to that described above with reference to FIG. 1, and that flow control subsystem 210C may be further modified to include any of the features described above with reference to FIGS. 2A and 2B.

Similar to the embodiments described above, flow control subsystem 210C includes a flow control device 215C having a first input port 213C-I1 coupled to receive aqueous solution 115-1 by way of a conduit section 212C-1, where aqueous solution 115-1 is generated in the manner described above such that it includes acid substance (e.g., HCl) at a target acid concentration. Flow control subsystem 210C differs from previous embodiments in that flow control device 215C also includes a second input port 213C-I2 coupled to receive CO$_2$ from a suitable source (e.g., by way of a second conduit section 212C-2). In some embodiments the CO$_2$ is injected in the form of a pressurized gas or dissolved in a liquid media (e.g., a solution including the permeate generated by the OAE system's BPED, as described above with reference to FIG. 1). Controller 280C is configured to control flow control device 213C such that both aqueous solution 115-1 and carbon dioxide CO$_2$ are injected through injection well pipe 211 into alkaline formation 60A such that, as injected aqueous solution passes along flow channel 63, interaction of the acid substance (e.g., HCl) contained in injected aqueous solution 115-2 and alkaline rocks 61 generates dissociated divalent ions (e.g., Mg$^{2+}$ and/or Ca$^{2+}$) that are located within pores/fractures 62 of alkaline formation 60A, and such that a subsequent reaction between the CO$_2$ and the divalent ions mineralizes the CO$_2$ in the form of solid and stable carbonate rocks (e.g., CaCO$_3$ (limestone) or CaMg(CO$_3$)$_2$ (dolostone)).

FIGS. 4A and 4B depict a simplified partial in-situ acid neutralization subsystem 200D during sequentially occurring time periods T21 and T22. Neutralization subsystem 200D differs from neutralization subsystem 200C (FIG. 3) only in that the generalized flow control device 215C shown in FIG. 3 is implemented by a three-way valve 215D in FIGS. 4A and 4B for clarity. FIG. 4A shows subsystem 200D during time period T21 in which valve 215D is in a first operating state that causes aqueous solution 115-1 (which includes acid substance from acid byproduct 112-2 as described above) to be injected into alkaline formation 60A, and FIG. 4B shows subsystem 200D during a second time period T22 in which valve 215D is switched into a second operating state that causes CO$_2$ to be injected into alkaline formation 60A. Specifically, as indicated in FIG. 4A, during time period T21 controller 280D generates a first control signal $C_{CV(T21)}$ that causes control valve 215D to open a first inlet port 215D-I1 such that aqueous solution 115-1 passes through control valve 215D and injection well 211 into alkaline formation 60A. In contrast, as indicated in FIG. 4B, at time T22 controller 280D generates a second control signal $C_{CV(T22)}$ that causes control valve 215D to open second inlet port 215D-I2, thereby passing CO: through injection well 211 into alkaline formation 60A. Note that, in this example, second inlet port 215D-I2 is fully closed during time period T21 (i.e., zero CO; is injected into formation 60A during time period T21), and first inlet port 215D-I1 is fully closed during time period T22 (i.e., zero aqueous solution 115-1 is injected into formation 60A during time period T22). In other embodiments (not shown), control valve 215D may be controlled to simultaneously inject CO; and aqueous solution 115-1.

FIGS. 5A and 5B are diagrams illustrating exemplary chemical changes within geology 60 during time periods T21 and T22, respectively. As described above and illustrated in FIG. 4A, during time period T21 aqueous solution 115-1 is injected into formation 60A such that it travels (flows) through pores/fractures 62 between mafic/ultramafic rocks 62, whereby the HCl contained in aqueous solution 115-1 is brought into contact with mafic/ultramafic rocks 61. As depicted in FIG. 5A, this contact causes the HCl to interact with mafic/ultramafic rocks 61 to generate dissociated divalent ions (e.g., Mg$^{2+}$, Ca$^{2+}$). Subsequently, as described above and illustrated in FIG. 4B, during time period T22 CO$_2$ is injected into formation 60A such that it travels through pores/fractures 62, whereby the CO$_2$ is brought into contact with the dissociated divalent ions (e.g., Mg$^{2+}$, Ca$^{2+}$) that were generated during time period T21. As depicted in FIG. 5B, this contact causes the CO$_2$ to react with the dissociated divalent ions in a way that mineralizes the CO$_2$ (e.g., such that the reaction between the injected CO$_2$ and the dissociated divalent ions (e.g., Mg$^{2+}$, Ca$^{2+}$) in the presence of mafic/ultramafic rocks creates limestone (CaCO$_3$) and/or dolostone (CaMg(CO$_3$)$_2$).

In some embodiments, each acid injection occurs before a series of CO$_2$ injections (e.g., acid solution is injected at time T21, then CO$_2$ is injected at times T22, T23, etc.). In these cases, the acid injection may serve as an acid pre-flush, which may be useful to unplug the near well bore region because precipitation of carbonate can result in a loss of permeability with the minerals clogging up the pore/fracture space. In particular, at the beginning of the process carbonates may not precipitate as pure (e.g., MgCO$_3$) but as the hydrated version MgCO$_3$·nH$_2$O. The hydrated version has a needle-like structure that does not help with permeability. Hence, the acid flush may help to reestablish injectivity and help to push precipitation further away from the injection well. Another scenario is acid alternating CO$_2$. In this case, CO$_2$ is not dissolved in any other media but injected as a gas, whereby it will have the tendency to gravity override (i.e. move to the top of the reservoir structure). This is not desirable because it limits contact between CO$_2$ and the reservoir body (i.e., the CO$_2$ should be distributed vertically). By alternating the CO$_2$ injection helps to minimize the gravity override issue.

Combining the above-mentioned in-situ acid neutralization process with carbon CO$_2$ mineralization significantly increases the CO$_2$ mineralization rate because the HCl provided in the acid solution facilitates rock dissolution at a substantially higher rate (i.e., in comparison to carbon acid), which ultimately leads to a higher total capacity of potential mineralized CO: per mass of rock. In one embodiment, the CO$_2$ is injected in a solution formed using permeate 111-2 (i.e., generated by the BPED 110). The injection rate of acid solution (that is, the volumetric rate of acid injection compared to the volume and porous base of rock) can be adjusted so that the pH after dissolution of the rock is an ideal range for CO$_L$ mineralization. In some embodiments, acid injection can occur again (i.e., following a CO$_2$ injection) when rock dissolution rates start to slow or carbonate mineralization formation leads to blockage of pores (flow channels through the rock) or in combination with proppants to fracture the formation and avoid closure. The combination of in-situ acid neutralization and $CO_2$ injection facilitates long term storage (i.e., greater than 1,000 years) of $CO_2$ within the alkaline formation 60A.

Although the present invention has been described with respect to certain specific embodiments, it will be clear to those skilled in the art that the inventive features of the present invention are applicable to other embodiments as well, all of which are intended to fall within the scope of the present invention. For example, the in-situ acid neutralization subsystems described herein may be utilized in conjunction with an ex-situ acid neutralization subsystem, such as the described in co-owned and co-pending U.S. application Ser. No. 18/620,819, entitled "OAE SYSTEM WITH CONTROLLED ACID NEUTRALIZATION", which is incorporated herein by reference in its entirety.

The invention claimed is:

1. An ocean alkalinity enhancement (OAE) system disposed adjacent to an ocean and a alkaline formation, the alkaline formation including a flow channel extending through alkaline rocks between an injection well and a recovery well, the OAE system comprising:
   a bipolar electrodialysis device (BPED) configured to electrochemically processes salt to generate an ocean alkalinity product and an acid byproduct including an acid substance, the BPED also being configured to supply the ocean alkalinity product to the ocean in a way that both reduces atmospheric carbon dioxide and mitigates ocean acidification; and
   an in-situ acid neutralization subsystem configured to generate an aqueous solution including at least some of the acid substance provided in the acid byproduct, and to inject an aqueous solution into the injection well such that the injected aqueous solution flows along the flow channel and exits the alkaline formation through the recovery well,
   wherein the in-situ acid neutralization subsystem is configured to optimize a flow rate of the acid substance injected into the alkaline formation by way of the aqueous solution such that (a) a maximum amount of the acid substance provided in the acid byproduct is included in the aqueous solution injected into the injection well, and (b) a minimum amount of acid substance is present in the aqueous solution exiting the alkaline formation through the recovery well, and
   wherein the in-situ acid neutralization subsystem comprises:
   a first sensor configured to measure first acid substance parameters associated with a first amount of said acid substance contained in the acid byproduct and to generate first data indicating the first acid substance parameters;
   a second sensor configured to measure second acid substance parameters associated with a second amount of said acid substance contained in the aqueous solution exiting through the recovery well and to generate second data indicating the second acid substance parameters;
   a controller configured to utilize the first data to determine the first amount of acid substance included in the acid byproduct, to utilize the second data to determine the second amount of acid substance exiting through the recovery well, and to generate an injection control signal in accordance with a relationship between the first and second amounts; and
   a flow-control subsystem configured to receive the acid byproduct and to generate the aqueous solution such that a flow rate of the acid substance injected into the injection well is controlled in response to the injection control signal.

2. The OAE system of claim 1, wherein the flow-control subsystem comprises:
   a conduit having an input end configured to receive the acid byproduct from the BPED and having an output end operably coupled to the injection well, and
   a flow control device operably coupled to the conduit between the input end and the output end and configured to control the flow rate of the acid substance injected into the injection well by modifying a rate at which the acid byproduct is injected into the injection well in response to corresponding changes to the one or more injection control signals.

3. The OAE system of claim 2,
   wherein the controller is further configured to utilize the first data and the second data to determine a target acid concentration of the acid substance in the aqueous solution, and to generate one or more mixture control signals according to the target acid concentration value, and
   wherein the flow control device comprises a mixing apparatus configured to generate the aqueous solution having said target acid concentration by mixing a first amount of the acid byproduct with a second amount of a buffer solution in accordance with the one or more mixture control signals.

4. The OAE system of claim 3, wherein the mixing apparatus comprises:
   a first flow rate control device coupled to receive the acid byproduct from the BPED and to expel the acid byproduct at a first flow rate;
   a second flow rate control device coupled to receive the buffer solution and to expel the buffer solution at a second flow rate;
   a mixing tank configured to generate the aqueous solution by combining both the acid byproduct expelled from the first flow rate control device and the buffer solution expelled from the second flow rate control device; and
   a control pump configured to inject the aqueous solution into the alkaline formation,
   wherein the controller is further configured to control the first and second flow rate control devices such that the aqueous solution generated by the mixing tank has the target acid concentration, and
   wherein the controller is further configured to control the control pump such that the injected aqueous solution has the optimized acid substance flow rate.

5. The OAE system of claim 2,
   wherein the flow control device is further configured to receive carbon dioxide, and
   wherein the controller is configured to control the flow control device such that both the aqueous solution and the carbon dioxide are injected through the injection well pipe into the alkaline formation such that said interaction of the acid substance and the alkaline rocks generates dissociated divalent ions that are located within the alkaline formation, and such that a reaction between the $CO_2$ and the divalent ions mineralizes the $CO_2$ in the form of carbonate rocks.

6. The OAE system of claim 5, wherein the controller is configured to control the flow control device such that the aqueous solution is injected into the alkaline formation during a first time period, and such that the carbon dioxide is injected into the alkaline formation during a second time period, the second time period occurring after the first time period.

7. The OAE system of claim 1, further comprising an alkaline processing system configured to generate an alkaline product by receiving and processing the aqueous solution exiting the alkaline formation through the recovery well.

* * * * *